March 15, 1938.  O. H. FOWLER  2,111,320
BRAKE
Original Filed April 29, 1931
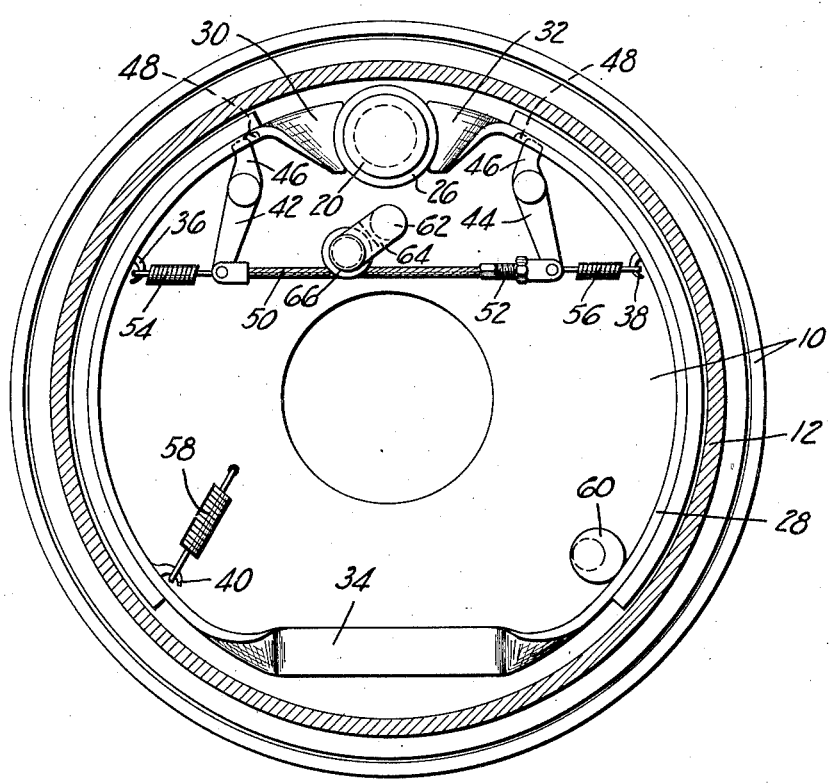
INVENTOR
OWEN H. FOWLER
BY
ATTORNEY Patented Mar. 15, 1938

2,111,320

UNITED STATES PATENT OFFICE 2,111,320

BRAKE

Owen H. Fowler, Detroit, Mich., assignor to Bendix Brake Company, South Bend, Ind., a corporation of Illinois Original application April 29, 1931, Serial No. 533,737. Divided and this application August 19, 1936, Serial No. 96,792

2 Claims. (Cl. 188—78)

This invention relates to brakes, and more particularly, to applying means for brakes.

An object of the invention is to provide a simple and effective applying device employing a tensioned cable.

Another object is to provide an applying means for a brake band or shoe including means for retaining the band or shoe against lateral movement.

A further object is to provide an applying device for an internal expanding brake of the shiftable anchorage type, which freely permits shifting of the friction elements.

Still another object is to provide an operating means including a pair of levers and means providing for simultaneous movement of the levers.

The above and other objects and desirable particular constructions will more fully appear by reference to the following detailed description of an illustrative embodiment shown in the accompanying drawing in which:

The figure is a sectional view of an internal expanding brake embodying my invention, taken just inside the head of the brake drum and showing the friction element in side elevation.

Referring to the drawing, there is shown a brake having the usual rotatable brake drum 12, the open end of which is closed by a relatively stationary support or backing plate 10, upon which is mounted a friction element of any desired type, but shown as a flexible band 28 having separable ends 30 and 32, and a rigid portion 34 opposite said ends. The band is also provided with the usual friction lining and has three hooks, 36, 38 and 40 spaced about the inner surface thereof for engagement with return springs. The novel features of the band 28 are more fully described and claimed in my copending application, Serial No. 533,737, filed April 29, 1931, of which this is a division.

Although my novel applying device is suitable for application to many different kinds of brakes, e. g. the common two-shoe brake, the illustrated brake is of the shiftable anchorage type, having a single anchor post 20, secured to the backing plate 10 between the separable ends 30 and 32 of the band 28 and adapted to receive the braking torque from either of said ends depending upon the direction of rotation of the drum 12.

My novel operating means or applying device comprises corresponding levers 42 and 44 pivoted on the backing plate. These levers have offset ends 46 engaging slots 48 in the inner periphery of the band. The other ends of the levers are connected by a cable 50 with a suitable adjusting member 52 interposed. The cable is normally held under tension by return springs 54 and 56.

These springs are connected between the pivots connecting the cable to levers and the hooks 36 and 38 on the band. These springs together with an auxiliary return spring 58 connected between the hook 40 on the band and a fixed support on the backing plate serve to retain the band when in the off position against the anchor and a suitable adjustable stop 60. Because of the particular arrangement of the levers use of steady rests is avoided, since the relation of the levers to the band is such that the band is retained against lateral movement.

Positioned on the backing plate is an operating shaft 62 to which power is applied through a lever, not shown. The shaft 62 has suitably secured thereto an arm 64 upon which is positioned for rotation a flanged roller 66 adapted to travel on the cable 50.

Assuming that force is applied to rotate the shaft 62, the arm 64 is moved angularly. This causes roller 66 to travel on the cable 50 and to bend the cable. The force imposed on the cable through the roller draws the ends of the levers 42 and 44, to which the cable is connected, toward each other with the result that the offset ends 46 of the levers move in opposite directions away from the anchor, causing the band to move into drum engagement.

As the band is moved into drum engagement, the wiping action of the drum causes a slight shifting of the band circumferentially of the brake and the levers will reposition themselves, to accommodate this movement by drawing the cable 50 over the roller 66 without substantial effect on the position of the lever 64. Thus the novel applying device freely adapts itself to varying conditions of wear of the brake and to the shifting of the band for forward and reverse braking.

While only one embodiment of my invention has been described in detail, it is not my intention that the scope of my invention should be limited to that embodiment or otherwise than by the terms of the appended claims.

I claim:

1. A brake comprising a friction element having separable ends, a support for said friction element, levers pivoted intermediate their ends on said support each having an end engaging the friction element adjacent one of the separable ends respectively, a flexible tension member connecting the other ends of the levers, means for exerting a force transversely on said tension member, and springs tensioned between said other ends of the levers and the friction element.

2. A brake comprising a friction element having separable ends and provided with recesses adjacent said ends, a support for said friction element, levers pivoted intermediate their ends on said support each having an end engaging one of said recesses respectively, a flexible tension member connecting the other ends of the levers, means for exerting a force transversely on said tension member, and springs tensioned between said other ends of the levers and the friction element.

OWEN H. FOWLER.